(12) United States Patent
Ohnishi et al.

(10) Patent No.: US 12,311,947 B2
(45) Date of Patent: May 27, 2025

(54) CONTROL DEVICE FOR VEHICLE

(71) Applicant: TOYOTA JIDOSHA KABUSHIKI KAISHA, Toyota (JP)

(72) Inventors: Ken Ohnishi, Toyota (JP); Masato Tateno, Toyota (JP); Takashi Yuma, Toyokawa (JP); Yasuhiro Hiasa, Miyoshi (JP); Shunsuke Urabe, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/731,666

(22) Filed: Jun. 3, 2024

(65) Prior Publication Data

US 2025/0091580 A1 Mar. 20, 2025

(30) Foreign Application Priority Data

Sep. 15, 2023 (JP) ................................. 2023-150505

(51) Int. Cl.
*B60W 30/18* (2012.01)
*B60W 10/10* (2012.01)
*B60W 10/184* (2012.01)
*F16H 61/02* (2006.01)

(52) U.S. Cl.
CPC ...... *B60W 30/18127* (2013.01); *B60W 10/10* (2013.01); *B60W 10/184* (2013.01); *F16H 61/0204* (2013.01); *B60W 2710/1005* (2013.01); *B60W 2710/18* (2013.01)

(58) Field of Classification Search
CPC ........... B60W 30/18127; B60W 10/10; B60W 10/184; B60W 2710/1005; B60W 2710/18; F16H 61/0204
See application file for complete search history.

(56) References Cited

U.S. PATENT DOCUMENTS

2023/0226864 A1* 7/2023 Masunaga ........... B60W 30/182
280/446.1

FOREIGN PATENT DOCUMENTS

| EP | 4083475 A1 * | 11/2022 | ............. F16H 59/08 |
| JP | 2012090444 A * | 5/2012 | |
| JP | 2016199269 A * | 12/2016 | ............. F16H 59/08 |

* cited by examiner

*Primary Examiner* — Justin Holmes
(74) *Attorney, Agent, or Firm* — SoraIP, Inc.

(57) ABSTRACT

The vehicle comprises an auto-return shift lever which is operated to switch the shift range. When the shift lever is held at the N position for a predetermined holding period or longer during the regeneration control while the shift range is traveling in the D range, the electronic control device of the vehicle performs the braking cooperative control for gradually decreasing the regeneration torque and gradually increasing the wheel brake torque for a predetermined control period, and then switches the shift range to the N range.

5 Claims, 3 Drawing Sheets

CONTROL DEVICE FOR VEHICLE

CROSS-REFERENCE TO RELATED APPLICATION

This application claims priority to Japanese Patent Application No. 2023-150505 filed on Sep. 15, 2023, incorporated herein by reference in its entirety.

BACKGROUND

1. Technical Field

The present disclosure relates to a control device for a vehicle including an auto-return operation element to be operated to switch a shift range.

2. Description of Related Art

During regeneration control, a shift lever is occasionally switched from a drive (D) position for selecting a D range (=forward travel range) to a neutral (N) position for selecting an N range (=neutral range). In this case, there is a concern that the torsion of an axle or the like in the rotational direction due to regeneration torque is released at once by switching the shift range, thereby causing a shock. There is known a vehicle control device that executes braking force cooperation control for gradually decreasing regeneration torque and gradually increasing wheel brake torque in advance when the shift lever is switched from the D position to the N position, in order to suppress the occurrence of the above shock. An example of such a device is described in Japanese Unexamined Patent Application Publication No. 2012-90444 (JP 2012-90444 A). In JP 2012-90444 A, when the shift lever is operated from the D position to the N position, braking force cooperation control for gradually decreasing regeneration torque and gradually increasing wheel brake torque is executed in advance during a period in which the shift lever is operated to the N position. This is said to suppress the occurrence of a shock.

SUMMARY

There is known a so-called shift-by-wire shift operation device with an auto-return shift lever, unlike the configuration described in JP 2012-90444 A. In such a shift operation device, the shift lever is occasionally operated by a driver from a home (H) position as the initial position to the N position and held. In this case, as in JP 2012-90444 A, braking force cooperation control for gradually decreasing regeneration torque and gradually increasing wheel brake torque is executed in advance during a period in which the shift lever is held in the N position. This is considered to suppress the occurrence of a shock.

In the auto-return shift operation device, there is a short-term N operation in which the shift lever is operated by the driver from the H position to the N position in order to switch the shift range to the N range and immediately returned to the H position. The "short-term N operation" is an operation in which the shift lever is held at the N position for a predetermined holding period determined in advance or more and immediately returned to the H position. Here, if the predetermined holding period is set to be long, the driver must hold the shift lever for a long period in order to switch the shift range to the N range, which is a troublesome operation for the driver. If the predetermined holding period is set to be short, on the other hand, the period in which the shift lever is operated to the N position and held is rendered so short that a sufficient time for reducing regeneration torque is not secured, and there is a possibility that a shock may occur.

The present disclosure provides a control device for a vehicle in which the shift range is switched to the N range while suppressing the occurrence of a shock even when an auto-return shift lever is operated to the N position for a short period.

An aspect of the present disclosure provides a control device for a vehicle including an auto-return operation element to be operated to switch a shift range, in which when the operation element is held at a neutral (N) position for selecting an N range for a predetermined first period or more during travel with the shift range in a travel range and during regeneration control, the shift range is switched to the N range after braking force cooperation control for gradually decreasing regeneration torque and gradually increasing wheel brake torque is executed for a predetermined second period.

With the control device for a vehicle according to the present disclosure, when the operation element is held at an N position for selecting an N range for a predetermined first period or more during travel with the shift range in a travel range and during regeneration control, the shift range is switched to the N range after braking force cooperation control for gradually decreasing regeneration torque and gradually increasing wheel brake torque is executed for a predetermined second period. In this manner, regeneration torque is gradually decreased through the braking force cooperation control executed during the predetermined second period. Since the torsion of a power transfer path due to regeneration torque has been sufficiently reduced after the lapse of the predetermined second period, the occurrence of a shock is suppressed even if the shift range is switched to the N range. Therefore, the shift range is switched to the N range while suppressing the occurrence of a shock even when the shift lever is operated to the N position for a short period.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the drawings. Note that, in the embodiments, the drawings are simplified or modified as appropriate, and the dimensional ratios, shapes, and the like of the respective portions are not necessarily drawn accurately.

Figure 1:
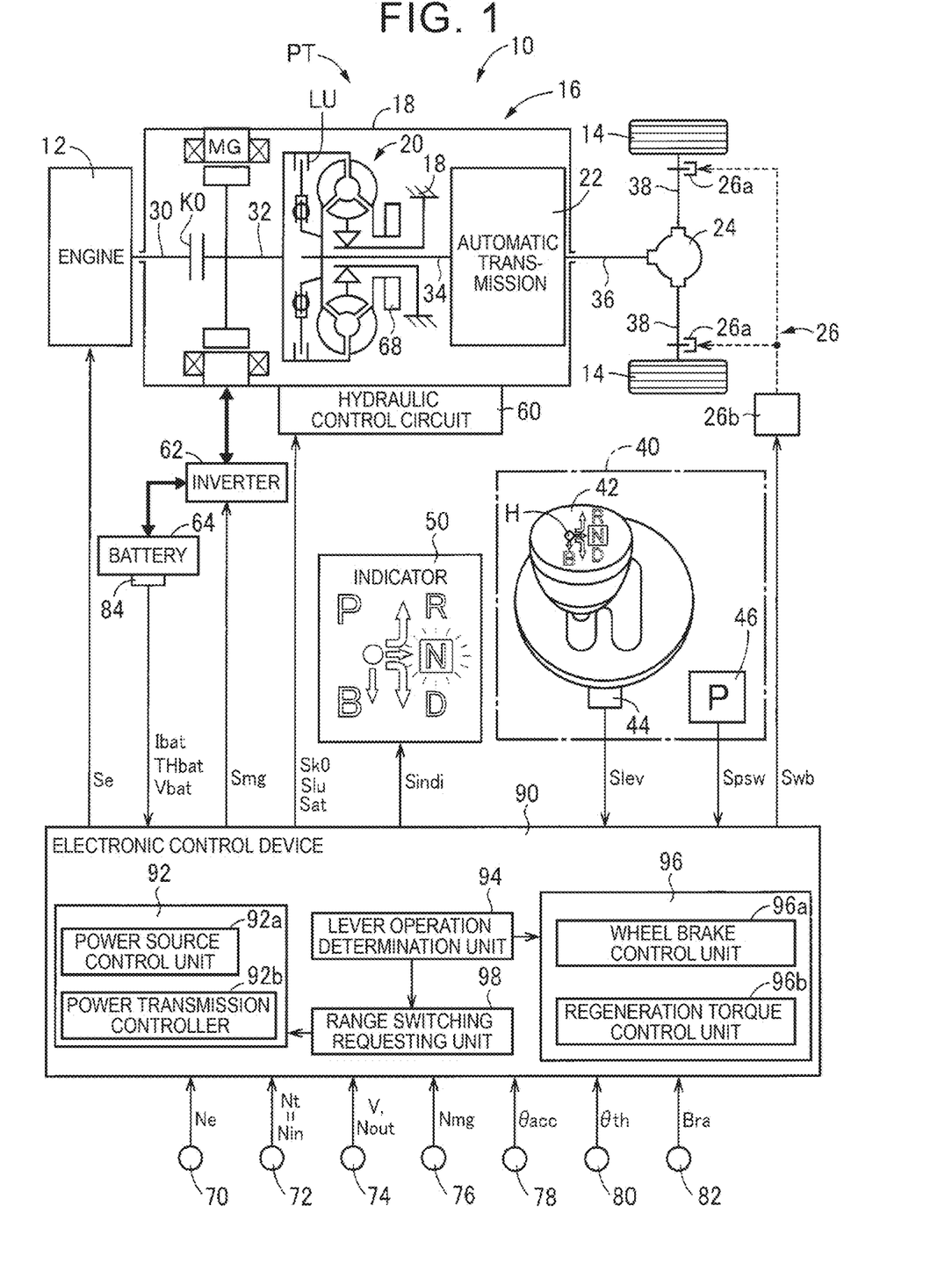
FIG. 1 is a schematic configuration diagram of a vehicle including an electronic control device according to an embodiment of the present disclosure, and is a functional block diagram illustrating a main part of a control function for various types of control in the vehicle.

FIG. 1 is a schematic configuration diagram of a vehicle 10 including an electronic control device 90 according to an embodiment of the present disclosure, and is a functional block diagram illustrating a main part of a control function for various types of control in the vehicle 10.

The vehicle 10 is a vehicle including an engine 12 and an electric motor MG, which are power sources for traveling, and a power transmission device 16 provided in a power transmission path PT between the engine 12 and the pair of drive wheels 14. Further, the vehicle 10 includes a shift operation device 40, an indicator 50, a hydraulic control circuit 60, an inverter 62, a battery 64, and an electronic control device 90.

The engine 12 is a well-known internal combustion engine. The engine torque Te [Nm], which is the output torque of the engine 12, is controlled by the electronic control device 90. The electric motor MG is, for example, a so-called motor generator having a function as an electric motor (i.e., a motor function) and a function as a generator (i.e., a generator function). The electric motor MG is, for example, a three-phase synchronous motor.

The power transmission device 16 includes, in order from the engine 12 side, an engine coupling shaft 30, a clutch K0, an electric motor coupling shaft 32, a torque converter 20, an input shaft 34 that is an input rotating member of the automatic transmission 22, an automatic transmission 22, and the like in the case 18. The power transmission device 16 includes an output shaft 36, a differential 24, a pair of axles 38, and the like, which are output rotation members of the automatic transmission 22. All of these are well known configurations. The case 18 is a non-rotating member attached to the vehicle body. The clutch K0 is a friction engagement device that connects and disconnects the power transmission between the engine coupling shaft 30 coupled to the engine 12 and the electric motor coupling shaft 32 coupled to the rotor of the electric motor MG, and is, for example, a wet-type multi-plate type hydraulic friction engagement device. In this specification, the torque, the driving force, the power, and the force (power) are the same unless otherwise specified.

The automatic transmission 22 is a well-known automatic transmission, and is, for example, a transmission of a planetary gear type, a constant meshing type, or the like. The automatic transmission 22 is controlled by the hydraulic control circuit 60 controlled by the electronic control device 90 so that a desired gear ratio γat is formed from among the different gear ratios γat. The gear ratio γat is a rotation speed ratio (=Nin/Nout) between the input-shaft rotational speed Nin [rpm] and the output-shaft rotation speed Nout [rpm]. The input-shaft rotational speed Nin is the rotational speed of the input shaft 34, and the output shaft rotational speed Nout is the rotational speed of the output shaft 36.

The hydraulic control circuit 60 supplies, for example, an actuator that performs connection and disconnection control of the lock-up clutch LU of the torque converter 20 and a regulated hydraulic pressure by using the hydraulic oil discharged from the oil pump 68 as a source pressure. The hydraulic control circuit 60 supplies the regulated hydraulic pressure to an actuator that performs the shift control of the automatic transmission 22, for example, by using the hydraulic oil discharged from the oil pump 68 as a base pressure.

The shift operation device 40 is an operation device for selecting one of a plurality of shift ranges. That is, the shift operation device 40 is an operation device that receives a shift range switching request by being artificially operated. The shift operation device 40 includes, for example, an operation element disposed in the vicinity of the driver's seat and selectively operated by the driver to a plurality of operation positions corresponding to the plurality of shift ranges. The shift range represents a power transmission status from the engine 12, which is a power source for traveling, and the electric motor MG to the pair of drive wheels 14, and includes, for example, an R range, an N range, a D range, and a P range, which will be described later.

The shift operation device 40 employs a so-called shift-by-wire system. The shift operation device 40 includes, for example, a shift lever 42 and a P switch 46. The shift lever 42 and the P switch 46 are both momentary type operation elements that are returned to the original position (initial position) in a state where no external force is applied. That is, the shift lever 42 and the P switch 46 are operation elements that are returned to the initial position when not operated by the driver (in other words, auto-return type operation elements that automatically return to the initial position when the operating force is released). The shift lever 42 corresponds to an "operation element" in the present disclosure.

The operation positions of the shift lever 42 are, for example, operation positions of "H position", "R position", "N position", "D position", and "B position". The "H position" is an initial position (home position) of the shift lever 42. Even if the shift lever 42 is operated to an operation position other than the "H position", if the driver releases the shift lever 42, the shift lever 42 is returned to the "H position" by a mechanical mechanism such as a spring. When the driver releases the shift lever 42, there is no external force acting on the shift lever 42. The "R position" is an operation position for selecting an R range that enables the vehicle 10 to travel backward. The "N position" is an operation position for selecting an N range in which power transmission from a power source for traveling to the pair of drive wheels 14 is interrupted and is in a neutral state. For example, in the N range, the automatic transmission 22 is in a neutral state. The "D position" is an operation position for selecting a D range that enables the vehicle 10 to travel forward. The "B position" is an operation position for selecting a decelerated forward traveling state in which the engine brake using the engine 12 is easily applied in a state in which the power transmission path PT for forward traveling is formed by the operation to the "D position". The state in which the power transmission path PT for forward travel is formed by operating to the "D position" is a state in which the engine braking effect is more strongly obtained.

The P switch 46 is, for example, a momentary push button switch. The P switch 46 is pushed by the driver, the power transmission from the driving power source to the pair of drive wheels 14 is cut off neutral state, and the P range in which the pair of drive wheels 14 are mechanically fixed in a non-rotatable manner is selected. The P range is a parking range. In a state in which the P switch 46 is not pushed in, the P switch 46 is set to its initial position (home position). If the driver releases the P-switch 46 even if the P-switch 46 is depressed, the P-switch 46 is returned to its initial position by a mechanical mechanism such as a spring. The "D range" and the "R range" are travel ranges, and the "P range" and the "N range" are non-travel ranges. The "N range" and the "D range" correspond to the "N range" and the "running range" in the present disclosure, respectively.

In response to the P range of the shift range, the automatic transmission 22 is controlled to a P range in which the power transmission state thereof is in a neutral state and the output shaft 36 connected to the pair of drive wheels 14 is mechanically fixed so as not to rotate. In accordance with the R range of the shift range, the automatic transmission 22 is controlled to an R range in which the power transmission state thereof enables reverse travel. In accordance with the N range of the shift range, the automatic transmission 22 is controlled to the N range in which the power transmission state thereof is set to the neutral state. In accordance with the D range of the shift range, the automatic transmission 22 is controlled to the D range in which the power transmission state thereof enables forward travel.

The indicator 50 is provided at a position that is easy for the driver to sec, and displays a shift range that is being selected. The indicator 50 may indicate, for example, the actual power transmission state of the automatic transmission 22. In the shift operation device 40 of the present embodiment, the shift lever 42 and the P switch 46 are returned to the initial position when no external force is applied. Therefore, the driver cannot recognize the selected shift range only by visually recognizing the shift lever 42 and the P switch 46. Therefore, it is useful to provide such an indicator 50.

The inverter 62 is a power supply circuit that converts direct current into alternating current or converts alternating current into direct current. MG torque Tmg [Nm], which is the output torque of the electric motor MG, is controlled by the electronic control device 90 via the inverter 62. When MG torque Tmg is a positive value, MG torque Tmg acts as a power source for driving the vehicle 10. When MG torque Tmg is negative, MG torque Tmg is regeneration torque and acts as a braking force for decelerating the vehicle 10. Hereinafter, the negative MG torque Tmg (<0) is referred to as "regeneration torque Tmg". Determination of the magnitude of the regeneration torque Tmg means determination of the magnitude of the absolute value of the regeneration torque Tmg. For example, when the regeneration torque Tmg (<0) approaches the zero value, the regeneration torque Tmg is described as "decreasing", and when the regeneration torque Tmg is separated from the zero value, the regeneration torque Tmg is described as "increasing".

The battery 64 is a secondary battery and is a battery for driving the electric motor MG.

The vehicle 10 includes a wheel brake device 26 as a braking device that applies braking torque by wheel brake torque Twb [Nm] (<0) to wheels (a pair of drive wheels 14 and a pair of driven wheels (not shown)). The wheel brake device 26 is a well-known electronically controlled brake (Electronic Control Brake). The wheel brake device 26 includes a brake body 26a and a braking hydraulic pressure supplying circuit 26b. The brake body 26a is a so-called disc brake. The brake body 26a, for example, sandwiches a pair of axles 38 connected to the pair of drive wheels 14 and a pair of axles connected to a pair of driven wheels (not shown) with a brake pad, respectively rotating in an integrated manner, and obtains a braking force by the frictional force. The braking hydraulic pressure supplying circuit 26b supplies brake hydraulic pressure (also referred to as brake braking hydraulic pressure) to a wheel cylinder provided in the brake body 26a in accordance with, for example, a braking operation amount Bra [%] by a brake pedal operation performed by the driver. The braking hydraulic pressure supplying circuit 26b is a hydraulic actuator. In the electronically controlled brake, an optimum ratio of the braking force for each wheel is calculated, and the braking force for each wheel is controlled so as to be the ratio.

In the normal state, the brake hydraulic pressure is supplied to the wheel cylinder so that the wheel brake torque Twb by the wheel brake device 26 becomes a braking force having a magnitude corresponding to the braking operation amount Bra. On the other hand, "braking cooperation control" is possible during regenerative control while the shift range is in the D range and the deceleration travels. In the braking cooperative control, for example, the vehicle braking torque TB [Nm], which is the sum of the regeneration torque Tmg and the wheel brake torque Twb, is controlled to be a braking force having a magnitude corresponding to the braking operation amount Bra. That is, the wheel brake torque Twb can be controlled so as to be obtained by subtracting the regeneration torque Tmg from the braking force (=vehicle braking torque TB) having a magnitude corresponding to the braking operation amount Bra. The regeneration torque Tmg does not exceed the torque capacity that can be transmitted by the automatic transmission 22. Further, the vehicle braking torque TB may be controlled to have substantially the same size within a range in which the driver does not feel uncomfortable due to sudden change in the braking force even if the vehicle braking torque is not strictly controlled to have the same size as the braking force corresponding to the braking operation amount Bra operated by the driver.

In the vehicle 10, for example, a traveling mode (hereinafter, referred to as a "BEV traveling mode") in which BEV traveling (Battery Electric Vehicle) using only the electric motor MG as a power source among the traveling power sources is performed, and a traveling mode (hereinafter, referred to as an "engine traveling mode") in which the engine traveling using at least the engine 12 as a power source among the traveling power sources are performed can be selected. In BEV running mode, the clutch K0 is released, and in the engine running mode, the clutch K0 is engaged.

The electronic control device 90 includes, for example, a so-called microcomputer including a CPU, RAM, ROM, an input/output interface, and the like. CPU performs various kinds of control of the vehicle 10 by performing signal-processing in accordance with a program stored in ROM in advance while using a temporary storage function of RAM. For example, the electronic control device 90 performs output control of the engine 12, output control of the electric motor MG, connection and disconnection control of the clutch K0, shift control of the automatic transmission 22, and the like. The electronic control device 90 corresponds to a "control device" in the present disclosure.

Various signals based on detection values by various sensors and the like provided in the vehicle 10 are input to the electronic control device 90. Examples of the sensor include a lever position sensor 44, a P switch 46, an engine rotational speed sensor 70, an input shaft rotational speed sensor 72, an output shaft rotational speed sensor 74, and the like. Examples of the sensor include a MG rotational speed sensor 76, an accelerator operation amount degree sensor 78, a throttle valve opening degree sensor 80, a braking operation amount sensor 82, and a battery sensor 84. Examples of the signal include a lever-position signal Slev, a P-switch signal Spsw, and the like. Examples of the signal include an engine rotational speed Ne [rpm] which is the rotational speed of the engine 12, and an input-shaft rotational speed Nin which is the same value as the turbine rotational speed Nt which is the rotational speed of the turbine blade wheel. Examples of the signal include an output-shaft rotational speed Nout corresponding to the vehicle speed V [km/h], and a MG rotational speed Nmg which is a rotational speed of the electric motor MG. Examples of the signal include an accelerator operation amount θacc [%] indicating an accelerator operation amount of the driver, a throttle valve opening θth [%], and a braking operation amount Bra indicating a deceleration operation amount of the driver.

Examples of such signals include battery charge/discharge current Ibat [A], battery-voltage Vbat [V], and battery-temperature THbat [° C.].

Various command signals are output from the electronic control device 90 to each device provided in the vehicle 10. The devices are, for example, an engine 12, a braking hydraulic pressure supplying circuit 26b, the indicator 50, a hydraulic control circuit 60, and the inverter 62. The various command signals are, for example, an engine control signal Se for controlling the engine 12, a wheel brake control signal Swb for controlling the wheel brake torque Twb, a shift range display signal Sindi for displaying the present shift range, and the like. The various command signals are, for example, a shift control signal Sat for controlling the shift of the automatic transmission 22, a K0 control signal Sk0 for controlling the engagement and disengagement of the clutch K0, and a LU control signal Slu for controlling the engagement and disengagement of the lock-up clutch LU. The various command signals are, for example, a MG control signal Smg for outputting and controlling the electric motor MG via the inverter 62.

A description will now be given of a situation where the shift lever 42 is operated for a short period of time N during regenerative control while the shift range is in the D range and BEV travels.

The electronic control device 90 functionally includes a drive device control unit 92, a lever operation determination unit 94, a braking force control unit 96 including a wheel brake control unit 96a and a regeneration torque control unit 96b, and a range switching requesting unit 98. The drive device control unit 92 includes a power source control unit 92a and a power transmission control unit 92b.

The power source control unit 92a controls the power of the engine 12 and the electric motor MG, which are power sources for traveling. For example, the power source control unit 92a calculates the required drive torque Trdem [Nm] by applying the accelerator operation amount θacc and the vehicle speed V to a predetermined relation (for example, a drive torque map) experimentally or by design. The power source control unit 92a controls the engine torque Te and MG torque Tmg so as to realize the required drive torque Trdem in view of the transmission loss, the auxiliary load, the gear ratio γat of the automatic transmission 22, and the like. During BEV running and the regeneration control, the engine 12 is stopped and the engine torque Te is controlled to be zero, and the regeneration torque Tmg is controlled to be a braking force having a magnitude corresponding to the braking operation amount Bra. When the regeneration torque Tmg exceeds the torque capacity that can be transmitted by the automatic transmission 22, the control is performed so that the wheel brake torque Twb becomes the excess amount.

The power transmission control unit 92b controls torque for transmitting the torque outputted from the driving power source to the pair of drive wheels 14. The power transmission control unit 92b executes, for example, the engagement and disengagement control of the clutch K0, the engagement and disengagement control of the lock-up clutch LU, and the shift control of the automatic transmission 22. During BEV running, the clutch K0 is controlled to be released, and the automatic transmission 22 is controlled to have a predetermined gear ratio γat in the D range.

The lever operation determination unit 94 determines whether or not an operation to the N position of the shift lever 42 has been performed. When the lever operation determination unit 94 determines that the operation of the shift lever 42 to the N position has been performed, the lever operation determination unit 94 outputs N operation information indicating the timing at which the shift lever 42 has been operated to the N position. When the shift lever 42 is operated to the N position by less than a predetermined holding time Phld [ms] to be described later, the N operation information is also outputted at the starting point of the operation. The lever operation determination unit 94 determines whether or not the shift lever 42 operated to the N position has been held for a predetermined holding period Phld or more, that is, whether or not the short-term N operation has been performed. For example, the predetermined holding duration Phld is several+[ms] to several hundred [ms].

When the lever operation determination unit 94 outputs the N operation information, the braking force control unit 96 starts the regeneration torque gradually decreasing control. That is, the regeneration torque gradually decreasing control is started from the time when the shift lever 42 is operated to the N position. The "regeneration torque gradually decreasing control" is a control for gradually decreasing the regeneration torque Tmg and gradually increasing the wheel brake torque Twb in the braking cooperative control. That is, in the regeneration torque gradually decreasing control, the regeneration torque Tmg is gradually decreased and the wheel brake torque Twb is gradually increased while the vehicle braking torque TB is set to a braking force having a magnitude corresponding to the braking operation amount Bra. The "regeneration torque gradually decreasing control" corresponds to "braking cooperation control for gradually decreasing the regeneration torque and gradually increasing the wheel brake torque" in the present disclosure.

When the lever operation determination unit 94 determines that the short-term N operation has been performed, the braking force control unit 96 determines whether or not a predetermined control period Pctrl [ms] has elapsed since the time of outputting the N operation information, and executes the regeneration torque gradually decreasing control by a predetermined control period Pctrl. The "predetermined control period Pctrl" is an execution period of regeneration torque gradual reduction control predetermined experimentally or by design in which the driver feels a sense of discomfort that is felt by the driver with respect to the shock accompanying the switching of the shift range from the D range to the N range is within a predetermined allowable range. The "predetermined control period Pctrl" is a period longer than the predetermined holding period Phld. As compared with the predetermined holding period Phld, the predetermined control period Pctrl is a long period, and therefore, a sufficient period can be set as the running period of the regeneration torque gradually decreasing control. The wheel brake control unit 96a controls the wheel brake device 26 so that the wheel brake torque Twb assigned by the regeneration torque gradual reduction control is obtained. The regeneration torque control unit 96b controls Tmg of MG torque (<0) of the electric motor MG so that the regeneration torque becomes the regeneration torque Tmg assigned by the regeneration torque gradual reduction control.

When the predetermined control duration Pctrl has elapsed, the regeneration torque Tmg becomes equal to or less than the predetermined torque determination value Tmg_jdg. The predetermined torque determination value Tmg_jdg is a determination value of the regeneration torque Tmg in which shocks caused by switching of the shift range from the D range to the N range fall within a predetermined allowable range. The smaller the regeneration torque Tmg is, the less the twist of the axle or the like due to the regeneration torque Tmg is. If the twist of the axle or the like is small, even if the shift range is switched from the D range to the N range and the twist of the axle or the like due to the regeneration torque Tmg is released at once, it is unlikely to be shocked. The twist of the axle or the like due to the regeneration torque Tmg is the twist of the power transmission path PT due to the regeneration torque Tmg.

After the regeneration torque gradually decreasing control is executed for a predetermined control period Pctrl, the range switching requesting unit 98 outputs an N switching request signal which is a control signal requesting to switch the shift range to the N range. When the N switching request signal is outputted from the range switching requesting unit 98, the power transmission control unit 92b switches the automatic transmission 22 to the N range. Accordingly, the shift range is set to an N range in which power transmission to the pair of drive wheels 14 is interrupted.

When the lever operation determination unit 94 determines that the lever operation determination unit 94 outputs the N operation information but the short-term N operation is not performed, the braking force control unit 96 stops the starting regeneration torque gradual reduction control, and the range switching requesting unit 98 does not output the N switching request signal. That is, the shift range is not switched to the N range, and the D range is maintained.

Figure 2:
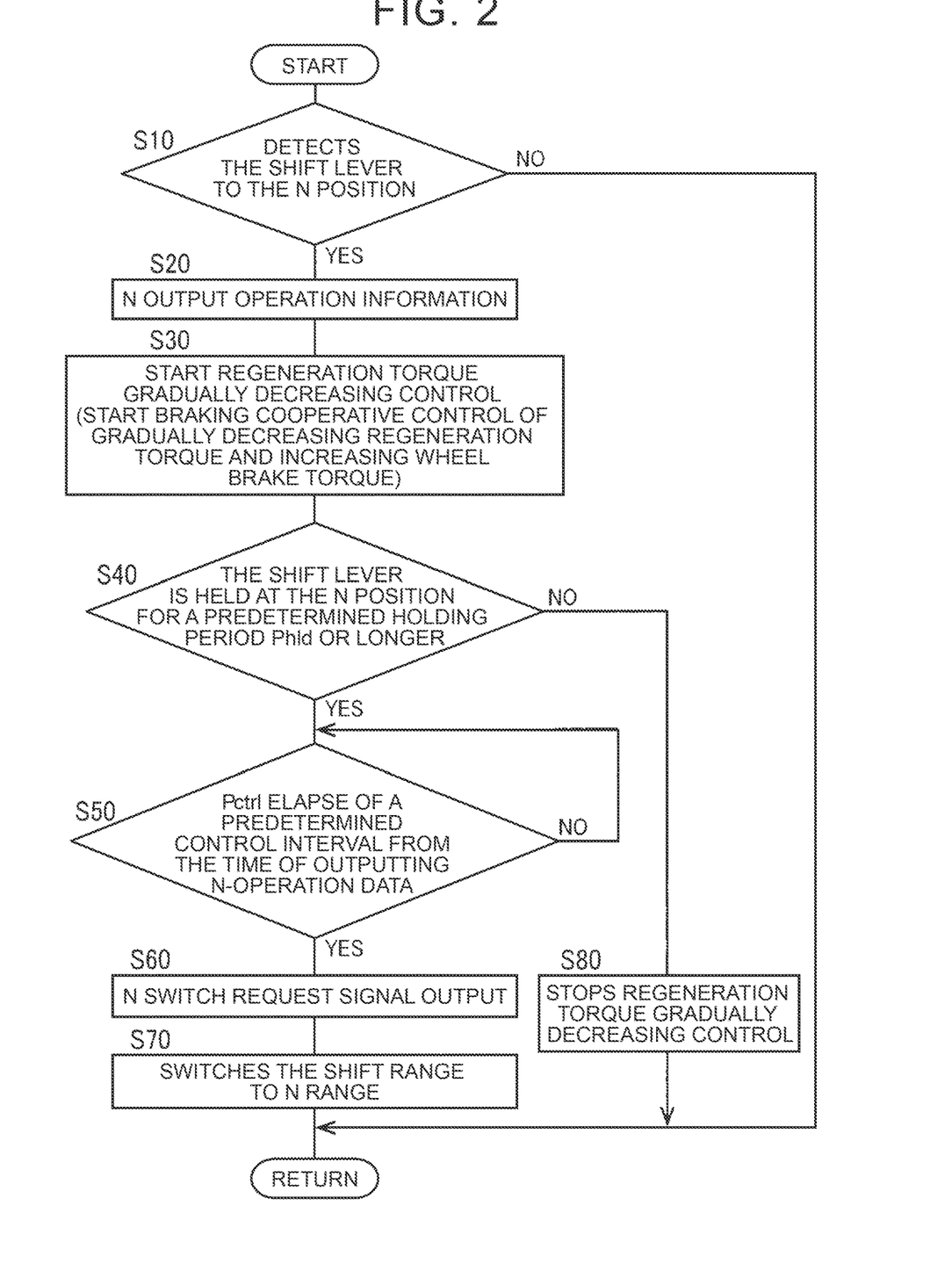
FIG. 2 is an exemplary flow chart illustrating the control operation of the electronic control device shown in FIG. 1.

FIG. 2 is an example of a flowchart for explaining a control operation of the electronic control device 90 illustrated in FIG. 1. The flowchart of FIG. 2 is repeatedly executed while the shift range is running in the D range and the regeneration control is in progress.

First, in a S10 corresponding to the function of the lever operation determination unit 94 (hereinafter, "steps" will be omitted), it is determined whether or not an operation to the N position of the shift lever 42 has been performed. When the determination of S10 is YES, the N operation information is outputted in S20 corresponding to the function of the lever operation determination unit 94. After S20 is executed, the regeneration torque gradually decreasing control is started at a S30 corresponding to the function of the braking force control unit 96.

After S30 is executed, it is determined whether or not the short-term N operation has been performed in S40 corresponding to the function of the lever-operation determination unit 94. When the determination of S40 is YES, it is determined whether or not a predetermined control duration Pctrl has elapsed from the time of outputting the N operation information in S50 corresponding to the function of the braking force control unit 96. S50 is executed again if the determination in S50 is NO. When the determination of S50 is YES, the N switching request signal is outputted in S60 corresponding to the function of the range switching requesting unit 98. After S60 is executed, the shift range is switched to the N range by switching the automatic transmission 22 to the N range in S70 corresponding to the function of the power transmission control unit 92b. When the determination of S40 is NO, the regeneration torque gradually decreasing control started in S30 is stopped at S80 corresponding to the function of the braking force control unit 96. When S10 is determined to be NO, after S70 is executed and after S80 is executed, both returns.

Figure 3:
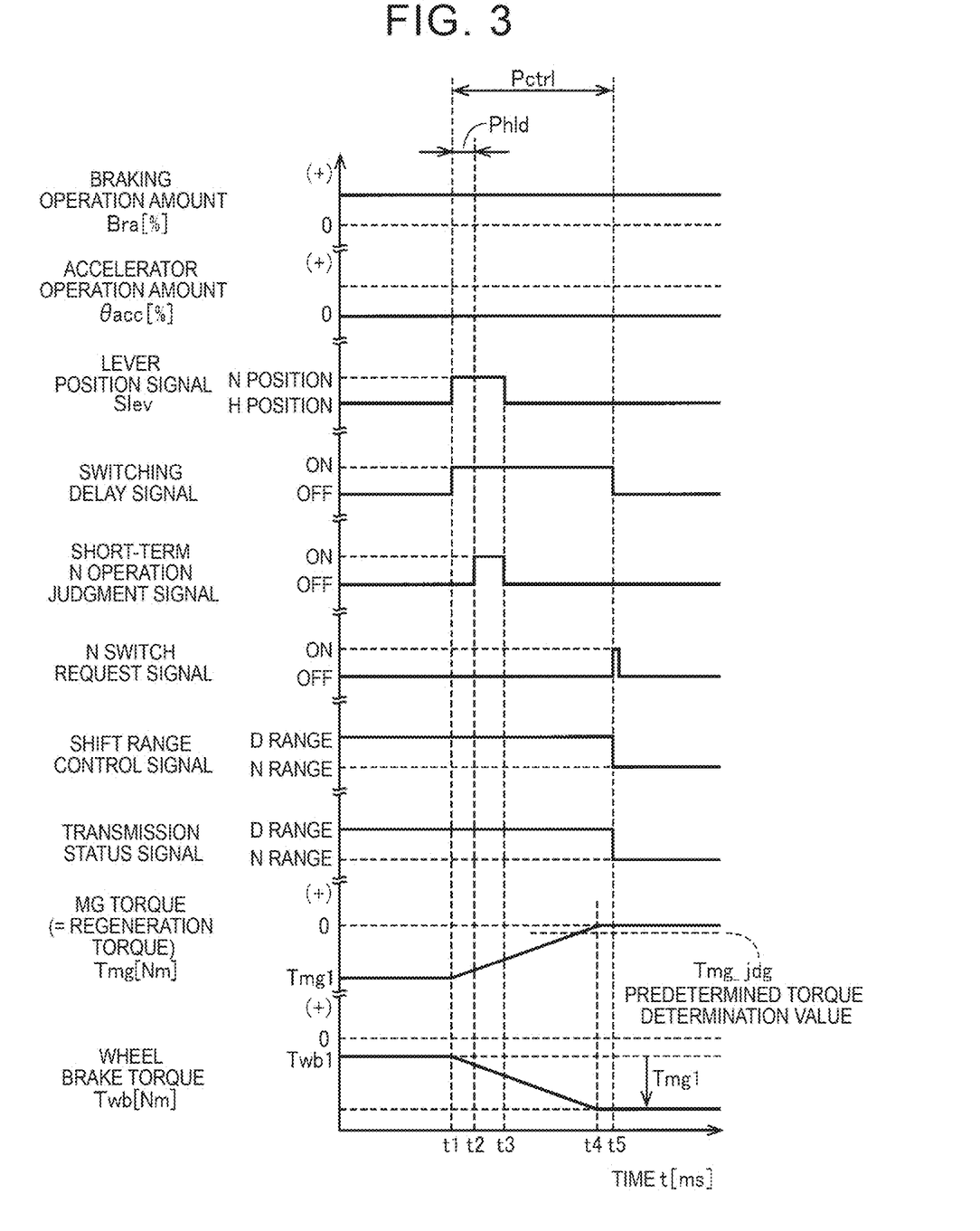
FIG. 3 is an example of a time chart when the flowchart of FIG. 2 is executed.

FIG. 3 is an example of a time chart when the flowchart of FIG. 2 is executed. In FIG. 3, the abscissa is the time t [ms].

Before the time t1, the vehicle 10 is running in the D range in the shift range and is under regenerative control. For example, the accelerator operation amount degree θacc is a zero value, the braking operation amount Bra is a constant value (>0), and the condition of the automatic transmission 22 is the D range. Thus, the regeneration torque Tmg is controlled to a predetermined torque value Tmg1, and the wheel brake torque Twb is controlled to a predetermined torque value Twb1.

In the time t1, the shift lever 42 is operated from the "H position" to the "N position" by the driver. At time t3 (>t1), the driver releases the shift lever 42 and the shift lever 42 is returned to the "H position". That is, the shift lever 42 is held at the "N position" during the time from the time t1 to the time t3, and the lever position signal Slev is a signal indicating the "N position". The period from the time t1 to the time t3 is longer than the predetermined holding period Phld. The switching delay signal delaying the switching timing of the shift range is switched from the off state to the on state at the time t1. The switching delay signal is switched from the on-state to the off-state at a time t5 (=t1+Pctrl) delayed by a predetermined control duration Pctrl from the time t1.

When the shift lever 42 is operated to the "N position" at the time t1, the regeneration torque gradually decreasing control is started. Accordingly, the regeneration torque Tmg is gradually decreased from the predetermined torque value Tmg1, and the wheel brake torque Twb is gradually increased from the predetermined torque value Twb1. The time t2 is a time at which a predetermined holding period Phld has elapsed from the time t1. In the period from the time t2 (=t1+Phld) to the time t3, the short-term N-operation determination signal indicating that the shift lever 42 is held at the "N position" for a predetermined holding period Phld or more is turned on. When the short-term N-operation determination signal is turned on, the regeneration torque gradually decreasing control is executed until the time t5. For example, at the time t4 (<t5) before the time t5, the regeneration torque Tmg becomes a zero value that is equal to or less than the predetermined torque determination value Tmg_jdg. The wheel brake torque Twb is the sum (=Twb1+Tmg1<0) of the predetermined torque value Twb1 and the predetermined torque value Tmg1.

At the time t5 when the switching delay signal is switched from the on-state to the off-state, the N switching request signal is outputted. Thus, the shift range control signal for controlling the shift range is switched from the D range to the N range, and the transmission state signal is switched from the D range to the N range. The shift range control signal is, for example, a shift control signal Sat that controls the automatic transmission 22 to be in a neutral condition. The transmission state signal is a signal indicating a power transmission state in the automatic transmission 22. When the transmission state signal is in the D range, the automatic transmission 22 is in a state in which forward travel of the vehicle 10 is enabled. When the transmission state signal is in the N range, the automatic transmission 22 is in a neutral state in which power transmission of the vehicle 10 is interrupted. When the transmission state signal is switched from the D range to the N range, the automatic transmission 22 is in the neutral state.

According to the present embodiment, the shift lever 42 may be held at the N position for a predetermined holding period Phld or more during the regeneration control while the shift range is traveling in the D range. In this case, after the regeneration torque gradually decreasing control is executed for a predetermined control period Pctrl, the shift range is switched to the N range. As described above, the regeneration torque Tmg is gradually decreased by the regeneration torque gradually decreasing control executed during the predetermined control duration Pctrl. Since the torsion of the power transmission path PT due to the regeneration torque Tmg is sufficiently reduced after the lapse of the predetermined control duration Pctrl, even if the shift range is switched to the N range, the generation of shocks is suppressed. Therefore, even when the shift lever is operated to the N position for a short period of time, the shift range is switched to the N range while the occurrence of the shock is suppressed.

According to the present embodiment, the regeneration torque gradually decreasing control is started from the time when the shift lever 42 is operated to the N position. As described above, since the regeneration torque gradually decreasing control is started prior to determining that the short-term N-operation has been performed, the predetermined control period Pctrl can be shortened by the predetermined holding period Phld. This suppresses a delay in switching the shift range to the N range in the short-term N operation.

According to the present embodiment, when the shift lever 42 is operated to the N position, but the shift lever 42 is not held at the N position for a predetermined holding period Phld or more, the regeneration torque gradual decrease control started from the time when the shift lever 42 is operated to the N position is stopped. The predetermined holding period Phld is a period shorter than the predetermined control period Pctrl. When the shift lever 42 is not held at the N position for a predetermined holding period Phld or longer, the regeneration torque decreasing control is executed only for a short period of time that is a predetermined holding period Phld. Thus, after the regeneration torque gradually decreasing control is stopped, the regenerative control having a larger regeneration torque Tmg than the wheel brake torque Twb is easily executed.

According to the present embodiment, the predetermined control period Pctrl is a predetermined fixed period in which shocks caused by switching of the shift range from the D range to the N range fall within a predetermined allowable range. When the predetermined control period Pctrl is set to a predetermined period, the regeneration torque Tmg is reliably reduced. Further, when the predetermined control period Pctrl is set to a predetermined period, the complexity of the control is suppressed as compared with a mode in which the predetermined control period Pctrl is changed according to, for example, the magnitude of the regeneration torque Tmg immediately before the short-term N-operation is performed.

It should be noted that the above-described embodiments of the present disclosure are examples of the present disclosure, and the present disclosure can be implemented in various modifications and improvements based on the knowledge of a person skilled in the art without departing from the gist thereof.

In the above-described embodiment, a mode has been described in which the shift range is the D range and the shift lever 42 is operated for a short period of time N during the regenerative control while the vehicle is traveling in BEV. However, the present disclosure is also applicable, for example, when the shift range is the R range instead of the D range. In this case, the R range corresponds to the "running range" in the present disclosure.

In the above-described embodiment, the regeneration torque gradually decreasing control is started from the time when the shift lever 42 is operated to the N position, but the present disclosure is not limited thereto. For example, the regeneration torque gradual decrease control may be started from a point in time when it is determined that the short-term N operation has been performed. Further, in the above-described embodiment, the regeneration torque gradually decreasing control is stopped in S80 of the flow chart of FIG. 2, but the present disclosure is not limited thereto. The present disclosure may be, for example, a mode in which the regeneration torque gradually decreasing control is continued without being stopped. The present disclosure may be configured such that the regeneration torque Tmg and the wheel brake torque Twb are returned to the status at the time of starting the execution of S30 by executing the braking cooperative control for gradually increasing the regeneration torque Tmg and gradually decreasing the wheel brake torque Twb.

In the above-described embodiment, the predetermined control period Pctrl is a predetermined fixed period in which the shock associated with the switching of the shift range from the D range to the N range is within the predetermined allowable range. For example, the predetermined control period Pctrl may be a period in which a shock associated with switching of the shift range from the D range to the N range falls within a predetermined allowable range (see FIG. 3). That is, for example, the predetermined control period Pctrl may be a period in which the regeneration torque Tmg is equal to or less than the predetermined torque determination value Tmg_jdg (see FIG. 3). In this aspect, the regeneration torque gradually decreasing control is executed during a period in which the regeneration torque Tmg is equal to or less than the predetermined torque determination value Tmg_jdg. As a result, since the regeneration torque gradually decreasing control is required and a sufficient period is set, the switching to the N range is suppressed from being excessively delayed while the occurrence of the shock is suppressed.

In the above-described embodiment, the braking operation amount Bra is a constant value (>0) in the time chart of FIG. 3, but the present disclosure is not limited thereto. For example, the present disclosure can also be applied to an aspect in which the braking operation amount Bra is zero. The present disclosure is also applicable to, for example, a mode in which the braking operation amount Bra changes. When the braking operation amount Bra is changed, the regeneration torque gradually decreasing control is a braking force having a magnitude corresponding to the braking operation amount Bra in which the vehicle braking torque TB changes. When the braking operation amount Bra is changed, the regeneration torque gradually decreasing control gradually decreases the regeneration torque Tmg and gradually increases the wheel brake torque Twb.

In the above-described embodiment, the mode in which the shift range is the D range and the short-term N-operation of the shift lever 42 is performed during the regeneration control while BEV is running has been described, but the disclosure is not limited to this mode. For example, the present disclosure is also applicable to a mode in which the shift range is the D range and the short-term N operation of the shift lever 42 is performed during the regenerative control while the engine is running. In this aspect, for example, when the short-term N-operation of the shift lever 42 is performed, the engine torque Te, which is the engine brake, the regeneration torque Tmg, and the wheel brake torque Twb act as the braking force. The automatic transmission 22 is switched from the D range to the N range after the regeneration torque gradually decreasing control (that is, the braking cooperative control for gradually decreasing the regeneration torque Tmg and gradually increasing the wheel brake torque Twb) is executed by a predetermined control duration Pctrl.

In the above-described embodiment, the switching of the shift range to the N range is realized by setting the automatic transmission 22 to the N range, but the present disclosure is not limited to this mode. For example, the vehicle 10 may be provided with a starting clutch instead of the torque converter 20 in the vehicle configuration of the above-described embodiment. In this case, switching to the N range may be performed in such a manner that the power transmission path PT is shut off and the shift range is set to the N range by setting the starting clutch to the released state (=disconnected state). For example, the vehicle 10 may not be provided with the engine 12 and the clutch K0 in the vehicle configuration of the above-described embodiment. In this case, switching to the N range May be performed in such a manner that the shift range is set to the N range by setting the electric motor MG to the non-driving state (=idling state).

What is claimed is:

1. A control device for a vehicle including an auto-return operation element to be operated to switch a shift range, wherein when the operation element is held at a neutral (N) position for selecting an N range for a predetermined first time period or more during travel with the shift range in a travel range and during regeneration control, the shift range is switched to the N range after braking force cooperation control for decreasing regeneration torque and increasing wheel brake torque is executed for a predetermined second time period.

2. The control device for a vehicle according to claim 1, wherein the braking force cooperation control is started at a time point when the operation element is operated to the N position.

3. The control device for a vehicle according to claim 2, wherein the braking force cooperation control started at the time point when the operation element is operated to the N position is stopped when the operation element is not held at the N position for the predetermined first time period or more.

4. The control device for a vehicle according to claim 1, wherein the predetermined second time period is a fixed period determined in advance in which a shock that accompanies switching of the shift range from the travel range to the N range is brought within a predetermined allowable range.

5. The control device for a vehicle according to claim 1, wherein the predetermined second time period is a period in which the regeneration torque becomes equal to or less than a predetermined torque determination value and in which a shock that accompanies switching of the shift range from the travel range to the N range is within a predetermined allowable range.

* * * * *